May 24, 1960   V. N. NORTON   2,937,630
COMPOUND INTERNAL COMBUSTION ENGINE
Filed Sept. 8, 1958   2 Sheets-Sheet 2
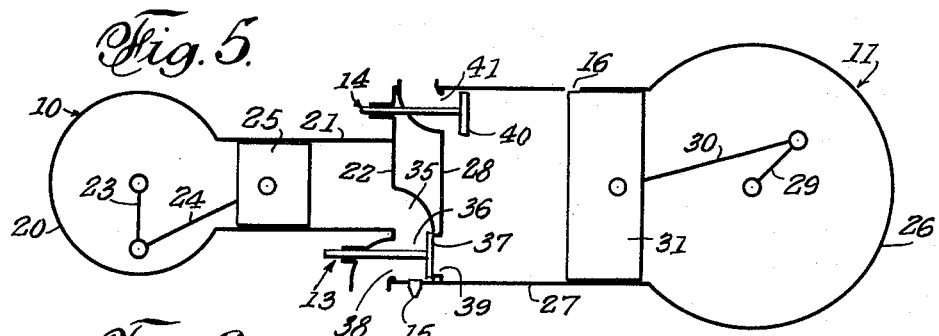
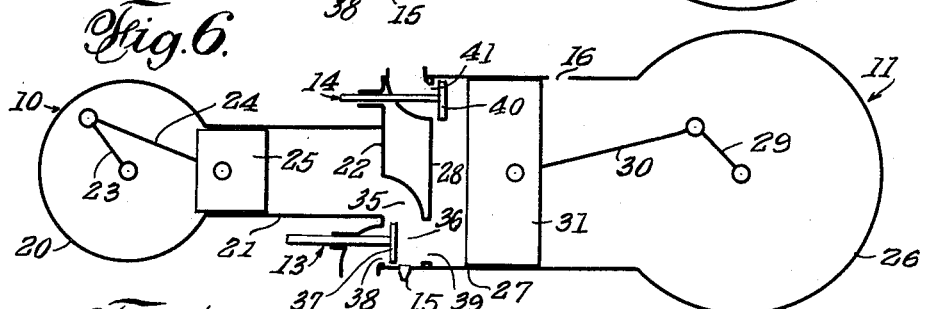
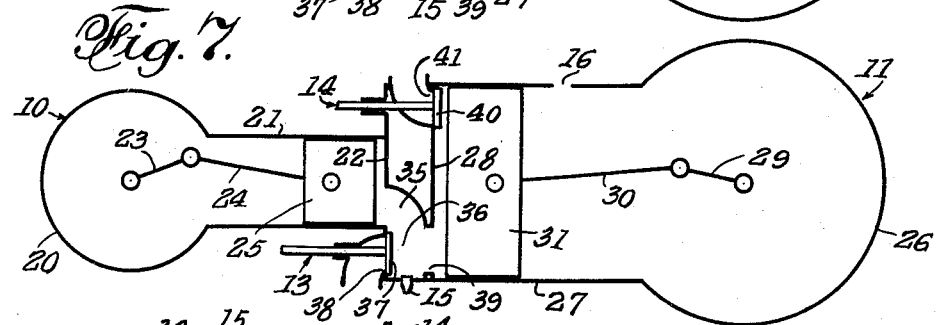
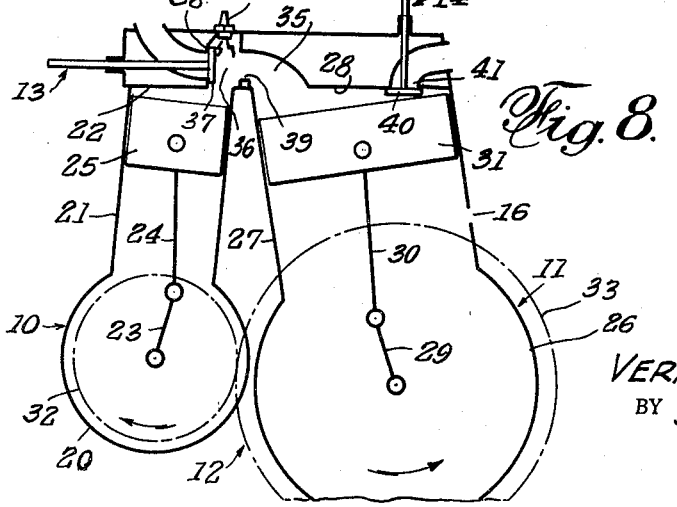
INVENTOR.
VERALD N. NORTON
BY C. G. Stratton
ATTORNEY

United States Patent Office 2,937,630
Patented May 24, 1960

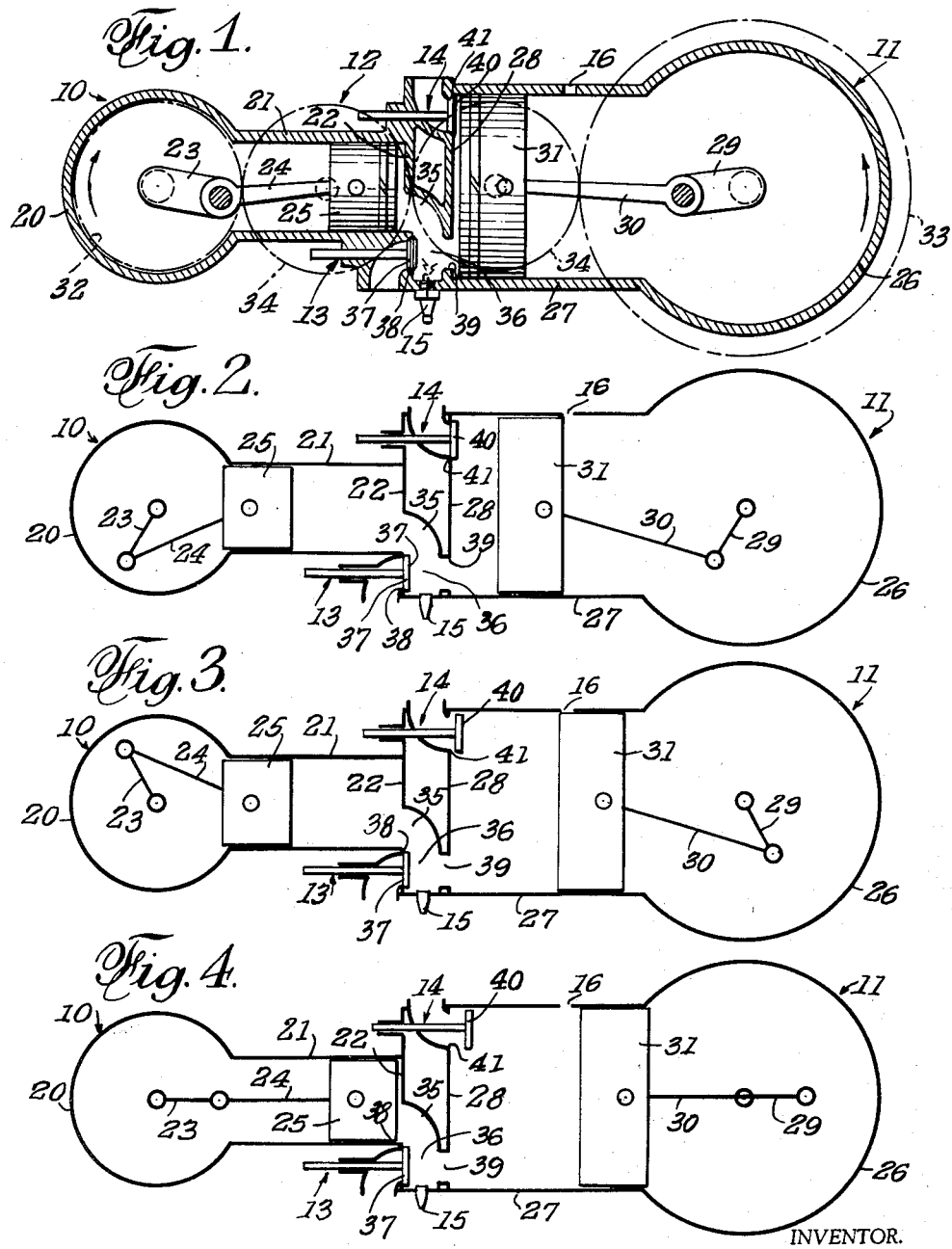

2,937,630

COMPOUND INTERNAL COMBUSTION ENGINE

Verald N. Norton, 2420 E. 30th S., Salt Lake City, Utah

Filed Sept. 8, 1958, Ser. No. 759,510

9 Claims. (Cl. 123—53)

This invention relates to a compound internal combustion engine.

An object of the present invention is to provide an internal combustion engine that provides a complete and slow expansion of the ignited gases thereby obtaining maximum power from the combustion of the fuel. Thus, by reason of such full and complete gas expansion, the need for a muffler in the engine exhaust is obviated, the same producing the mentioned maximum power because of lower back pressure.

Another object of the invention is to provide an internal combustion engine that provides two pistons in the combustion chamber, thereby providing a large area of transmission of the power of the pressure of the expansion gases in contradistinction to the mode of operation of conventional engines having but one piston.

A further object of the invention is to provide a compound engine of the character above referred to that is subject to less wear than ordinary engines and has lower vibration, both by reason of lower than conventional pressure on the bearing surfaces and because of a steady flow of power.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

Fig. 1 is a longitudinal sectional view of an internal combustion engine according to the present invention, the same being shown in firing or fuel injection position.

Fig. 2 is a schematic view of said engine during the initial phase of the expansion or power stroke.

Fig. 3 is a similar view during the final phase of the power stroke and the beginning of exhaust.

Fig. 4 is a similar view during an intermediate exhaust phase.

Fig. 5 is a similar view during continued exhaust and simultaneous intake of fresh fuel.

Fig. 6 is a similar view at the time the intake is closing and the final exhaust phase occurs.

Fig. 7 is a similar view showing the engine approaching full fuel compression preparation to ignition as in Fig. 1.

Fig. 8 is a schematic view of a modified form of engine.

The engine that is illustrated comprises, generally, a power cylinder unit 10, a larger power cylinder unit 11, means 12 gearing said units together, a fuel intake 13 to control intake to cylinder unit 10, and then communication of fuel between said units 10 and 11, and an exhaust 14. The present engine is provided with the usual ignition means 15 or, as an alternative, fuel injection means, and an optional additional exhaust port 16 in the cylinder unit 11. In Figs. 1 to 7, the units 10 and 11 are shown in aligned opposed relationship with the inlet and outlet where the same oppose each other. In the modification of Fig. 8, these units are shown in substantial side-by-side relationship to impart an A form to the engine.

In a generally conventional manner, the unit 10 is provided with a crankcase 20 from which extends a cylinder 21 that has a cylinder head 22. A crank 23 operates in the crankcase and the same, through the medium of a connecting rod 24, reciprocates a piston 25 in the cylinder 21.

Except that the area of its cylinder is approximately twice that of the cylinder 21, the unit 11, in a similar manner, is provided with a crankcase 26, a cylinder 27 having a head 28, a crank 29, a connecting rod 30, and a piston 31.

The above-described cylinder units 10 and 11 are shown with their respective cylinder heads 22 and 28 adjacent, whether in the opposed form of Fig. 1 or the side-by-side form of Fig. 8.

The gearing means 12 is such as to cause two revolutions of the crank 23 to one of the crank 29. To this end, said means, as in Fig. 1, has a gear 32 on the axis of crank 23 that is half the size of the gear 33 on the axis of crank 29. Intermediate gears 34 connect the gears 32 and 33. In the modification of Fig. 8, the gears 32 and 33 are in direct mesh because of the side-by-side relationship of the cylinder units 10 and 11.

The cranks 23 and 29 are so phased, relatively, that from a top dead center position of both, the crank 23 moves through 360° back to a top dead center position while crank 29 moves only 180° to a bottom dead center position. As the crank 29 completes the additional one-half rotational movement back to top dead center, the crank 23 moves through a second 360° to top dead center.

The two cylinders 21 and 27 have a common combustion chamber 35 that comprises an area 36 between and to one side of the heads 22 and 28. Of course, said combustion chamber may, and usually does, include adjacent portions of the cylinders 21 and 27. The spark plug 15 is connected to the combustion chamber and, as above indicated, a fuel injector may be provided as an alternative for said plug.

The fuel intake 13 is shown as a valve 37 that has two operative positions controlled by the usual cam shaft or in other conventional ways. Said valve 37 is movable across the combustion chamber 36 between a port 38 that controls flow of fuel into said chamber and a port 39 that controls flow of fuel between said combustion chamber and the cylinder 27. While the valve 39 may close against the port 38 under the pressure imposed during compression of a fuel charge in the engine, this valve may control port 39 merely by being moved thereinto in the manner of a piston. In such case, valve 37 will have moderate clearance with port 39 even when in the position nominally closing said port. Such small clearance is immaterial to the efficiency of operation and obviates clearance and/or design problems relating to the cam that controls said valve.

The exhaust 14 comprises a common form of poppet valve 40 that controls an outlet port 41, as by a conventional cam shaft. It will be realized that the cam controllers of the two valves 37 and 40 have been omitted since the same are, as explained, of conventional design. Also, the return springs ordinarily used to bias the valves to close the intake and the exhaust have been omitted as unnecessary to an understanding of the engine and its operation.

The following angular positions of the cranks 23 and 29 and the positions of their respective pistons 25 and 31 may be varied without departing from the broad concepts of the present invention.

*Operation*

The engine with both valves 37 and 40 closed is fired by igniting the plug 15 at 10° beyond top dead center of cylinder unit 10 and at 5° beyond top dead center of cylinder unit 11. This condition, shown in Fig. 1, is the beginning of the expansion or power stroke.

When the crank 23 has reached 120° beyond top dead center (the valves 37 and 40 remaining closed), the expansion in cylinder 21 is almost full. Since crank 29 has only moved through 60° beyond its top dead center, there is only partial expansion in cylinder 27. This is shown in Fig. 2. The crank 23 is at approximately its maximum power output in this position while the crank 29 is still capable of increased power output as the expansion in cylinder 27 continues.

Fig. 3 shows the crank 29 approaching bottom dead center and maximum expansion in cylinder 27. At this time, crank 23 has moved past bottom dead center and the piston 25 is now reversing its movement to start exhausting of cylinder 21. The inlet valve 37 remains closed, but the exhaust valve 40 cracks open at this time. It will be noted that port 16, if used, remains closed to this point and is about to open as the full exhaust of the cylinder 21 is reached at top dead center of crank 23, and maximum expansion in the cylinder 27 takes place at bottom dead center of crank 29. This is shown in Fig. 4. It will be obvious that the crank 23 has moved through 350° from the firing position and that the crank 29 has moved, at the same time, through 175°, i.e., at half speed of crank 23.

Now, as the piston 25 retracts and piston 31 projects, as in Fig. 5, the intake valve 37 is moved to close the port 39 between the cylinders 21 and 27, thereby opening intake port 38. A new charge of fuel is drawn by piston 25 into the cylinder 21 and, at the same time, the piston 31 is scavenging cylinder 27 through the still open exhaust.

As the crank 23 continues past bottom dead center, as shown in Fig. 6, the intake valve re-shifts to close the intake, thereby opening port 39 to effect communication of the cylinders 21 and 27. As a consequence, part of the fuel charge in cylinder 21 will be displaced into cylinder 27, and the same will push residual burnt gases through the exhaust as the piston 31 approaches top dead center. It is then that the exhaust valve closes.

This brings the engine to the position of Fig. 7 wherein both pistons are but a few degrees before top center and a substantially maximum compression. It will be clear that the next engine position is that of Fig. 1 where the firing or ignition takes place. Thereafter, the above cycle repeats with the piston 25 making two reciprocations for each reciprocation of piston 31.

The engine above described is preferably used in the horizontal position shown and the similarity thereto of the modification of Fig. 8 is deemed to be obvious and requires no further explanation. The position of the parts in the modification corresponds to the position of Fig. 1.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described my invention, what is claimed and desired to be secured by Letters Patent is:

1. An internal combustion engine comprising, two cylinder units one larger than the other and each provided with a piston, a combustion chamber common to both units, means to reciprocate the smaller piston twice for each reciprocation of the larger piston, a valve-controlled exhaust in the larger cylinder unit, and a valve-controlled fuel intake to the combustion chamber, the valve of the intake being movable to alternately control said intake and communication of the combustion chamber with the larger cylinder unit.

2. An internal combustion engine comprising, two cylinder units one larger than the other and each provided with a piston, a combustion chamber common to both units, means to reciprocate the smaller piston twice for each reciprocation of the larger piston, a valve-controlled exhaust in the larger cylinder unit, and a valve-controlled fuel intake to the combustion chamber and terminating in a first port open to the combustion chamber, a second port aligned with the first port and located between the combustion chamber and the larger cylinder unit, the valve of the intake being movable to alternately close said ports.

3. An internal combustion engine according to claim 2 in which the area of the larger piston is twice the area of the smaller piston.

4. An internal combustion engine according to claim 2 in which the means to move the pistons is phased to move the smaller piston to scavenge the smaller cylinder unit into the larger cylinder unit during continuing expansion of burnt gases in said larger cylinder unit.

5. An internal combustion engine according to claim 4 in which the piston-moving means is phased to draw a new charge of fuel into the smaller cylinder unit during part of the scavenging movement of the large piston in the larger cylinder unit.

6. An internal combustion engine comprising, two cylinder units one larger than the other and each provided with a piston, a combustion chamber common to both units, said two cylinder units being aligned with the combustion chamber between the cylinders of said units, means to reciprocate the smaller piston twice for each reciprocation of the larger piston, a valve-controlled exhaust in the larger cylinder unit, and a valve-controlled fuel intake to the combustion chamber, the valve of the intake being movable to alternately control said intake and communication of the combustion chamber with the larger cylinder unit.

7. An internal combustion engine comprising, two cylinder units one larger than the other and each provided with a piston, a combustion chamber common to both units, said two cylinder units being disposed in side-by-side relation with the combustion chamber connecting the upper ends thereof, means to reciprocate the smaller piston twice for each reciprocation of the larger piston, a valve-controlled exhaust in the larger cylinder unit, a valve-controlled fuel intake to the combustion chamber, said valve of the intake being movable to alternately control said intake and communication of the combustion chamber with the larger cylinder unit.

8. In a compound internal combustion engine having a combustion chamber communicating with two cylinders, an intake comprising a fuel inlet having a port open to said chamber, an aligned port communicating the combustion chamber and one of said cylinders, the other cylinder being open at all times to the combustion chamber, and a valve to alternately close said ports.

9. In a compound internal combustion engine having a combustion chamber communicating with two cylinders, an intake comprising a fuel inlet having a port open to said chamber, an aligned port communicating the combustion chamber and one of said cylinders, the other cylinder being open at all times to the combustion chamber, and a valve movable across the combustion chamber between positions to close the ports, alternately.

References Cited in the file of this patent

UNITED STATES PATENTS

| | | |
|---|---|---|
| 597,749 | Smith | Jan. 25, 1898 |
| 1,457,322 | Sproule | June 5, 1923 |

FOREIGN PATENTS

| | | |
|---|---|---|
| 14,341 | Great Britain | Oct. 30, 1884 |
| 43,788 | Germany | July 3, 1888 |
| 515,107 | Great Britain | Nov. 27, 1939 |